United States Patent Office.

WILLIAM B. GLEASON, OF BOSTON, MASSACHUSETTS.

Letters Patent No. 72,017, dated December 10, 1867.

---

IMPROVED METHOD OF MOULDING PLASTIC MATERIAL.

---

The Schedule referred to in these Letters Patent and making part of the same.

---

Be it known that I, WILLIAM B. GLEASON, of Boston, in the county of Suffolk, in the State of Massachusetts, have invented an improved process in the formation of articles moulded by pressure in moulds, from plastic and adhesive substances and compounds.

This invention is designed to facilitate, cheapen, and improve the production of moulded articles formed of adhesive substances or compounds, particular reference being had to the moulding of articles in imitation of wood-carvings.

The great difficulty which I have found in moulding such articles of adhesive substances or compounds, lies in the adhesion of the material to the mould. Oiling the surface of the mould lessens the liability of adhesion thereto, and with careful manipulation, moulded articles may be made of adhesive substances with a fair degree of success. Still, to produce ornaments rapidly and cheaply for the furniture and the mirror and picture-frame trade, and for similar purposes, it is an object to make the act of moulding one in which the chances of adhesion shall be lessened, and it is also an object to produce a surface which shall be smooth, and of close and compact texture, in order that it may polish well.

My invention enables me to effect both of said objects, and it consists in the process of making, out of a plastic adhesive substance, a thin sheet, (which I prefer to prepare by rolling, much in the manner in which pastry-cooks prepare pie-crust,) coating or dusting one side of this sheet with a dry powder, or covering it with a film of oil or other fluid, which will lessen the adhesiveness of the surface of the sheet, and then spreading said sheet, with its prepared surface, upon or over the surface of the mould, gently pressing the sheet into the indentations of the mould, and over its projections, and then filling up the mould within this sheet with adhesive plastic material, and finally submitting the contents of the mould to pressure, to complete the impression, and to compact and harden the entire moulded object. This thin sheet may be made of material which is more finely comminuted than that which is employed for filling or backing, and the finer the material the smoother and more compact will be the surface of the ornament.

When a mass of plastic adhesive substances is compressed into a mould having an irregular surface, the surface of the mass changes under compression, so that one portion of the surface may absorb or wipe off the oil or other fluid or powder with which the surface of the mould may have been prepared, in which case some succeeding portion of the surface of the material is liable to adhere to the surface of the mould, from which the more adhesive substance has been removed. Also, in pressing a mass of adhesive plastic material into a mould, the interior and more adhesive portions are liable to come to the surface of the mass and adhere to the mould. If fine powder is sifted or sprinkled into the mould, it accumulates in the depressions, so that the moulded object will have its high relief and sharp corners and lines injured or destroyed by the unequal presence of the dust or powder.

By the use of fine and consequently expensive material in the form of a thin veneer or coating, backed or filled up by a coarser and consequently cheaper material, I am enabled to produce ornaments of superior surface, with but trifling addition to the cost thereof. In applying non-adhesive substances to the surface of a thin sheet of plastic adhesive material, oil or other non-adhesive substances may be applied to the surface of the mould, as an additional precaution against sticking.

One reason why the application of non-adhesive material to the surface of the thin sheet described, operates better than the same amount of material applied to the surface of the mould, is that by the movement of the sheet in stretching and accommodating itself to the irregular surfaces of the mould, the non-adhesive material applied to the sheet is merely attenuated on the surface of the sheet, and is not wiped off therefrom wholly by such movement, as such material is liable to be in spots where applied directly to the surface of the mould.

Where in practice I use dust or powder of any suitable material for my non-adhesive substance, in connection with the thin sheet described, I use it, as a pastry-cook does flour, on the roller and board employed in reducing the sheet to the desired degree of thinness, and as in this way both sides of the sheet become coated with the powder, I prefer to brush off or remove the powder from the inner surface of the sheet before applying it to the mould.

I claim the process substantially as and for the purposes specified.

WILLIAM B. GLEASON.

Witnesses:
J. B. CROSBY,
FRANCIS GOULD.